United States Patent

[11] 3,556,189

[72] Inventor Richard B. Ernest
    Richboro, Pa.
[21] Appl. No. 817,620
[22] Filed Apr. 16, 1969
[45] Patented Jan. 19, 1971
[73] Assignee Penn Engineering & Manufacturing
    Corporation
    Danboro(Doylestown), Pa.
    a corporation of Delaware

[54] STUD
    13 Claims, 10 Drawing Figs.
[52] U.S. Cl. ................................................. 151/41.73,
                                                           29/432
[51] Int. Cl. .................................................. F16b 39/00
[50] Field of Search........................................ 151/41.73,
        41.72, 41.74, 41.7; 85/1K, 9, 1P; 287/20.3, 20,
                            20.5; 52/707; 85/45; 29/432, 505

[56]            References Cited
            UNITED STATES PATENTS
3,270,355  9/1966  Tildesley .................... 151/41.73X

| 3,270,793 | 9/1966 | Polmon | 151/41.73X |
| 3,329,057 | 7/1967 | Salz | 85/45X |
| 3,431,960 | 3/1969 | Neuschotz | 151/41.72 |

FOREIGN PATENTS

| 690,252 | 4/1953 | Great Britain | 151/41.72 |

Primary Examiner—Ramon S. Britts
Attorney—Denny and Denny

ABSTRACT: A fastener or the like is secured to a thin panel having a blind hole between its surfaces. The fastener or the like includes a head and a shank, the head including a first annular flange and a second annular flange of smaller radial extent than said first annular flange and defining with said first annular flange an undercut groove into which panel material is displaced by the first annular flange upon assembly to the panel sheet. The blind hole has an open end portion large enough to receive the second annular flange and has its opposite end portion closed by a part of the panel. The head has a recess juxtaposed with the part of said sheeted material closing the blind hole.

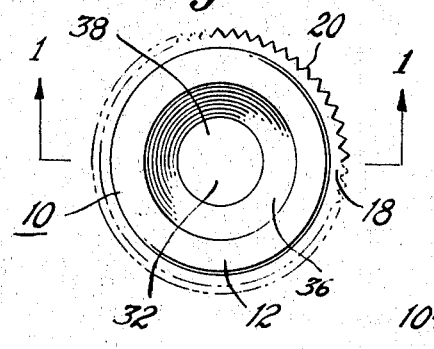
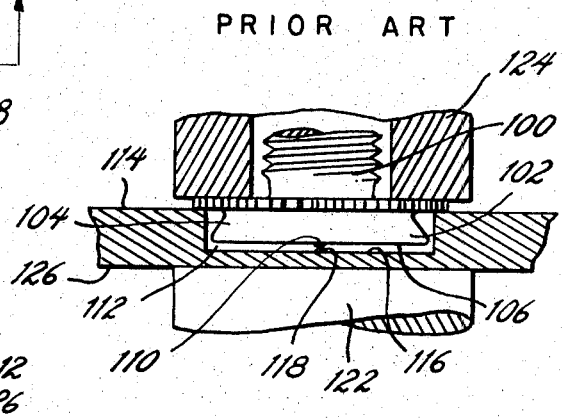
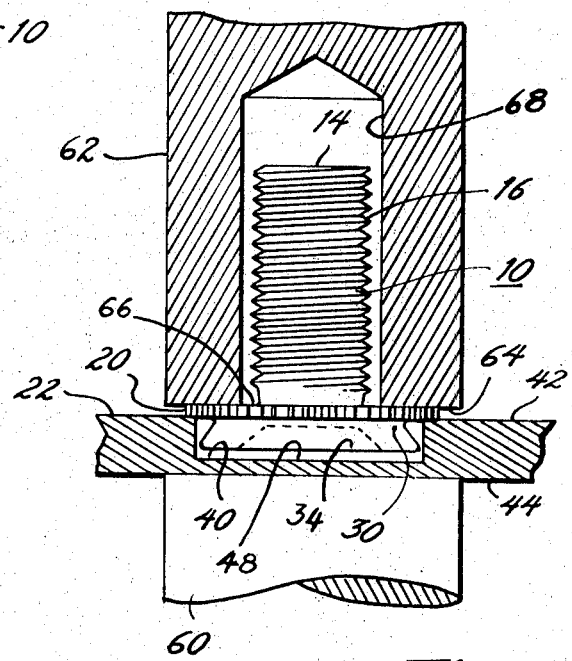
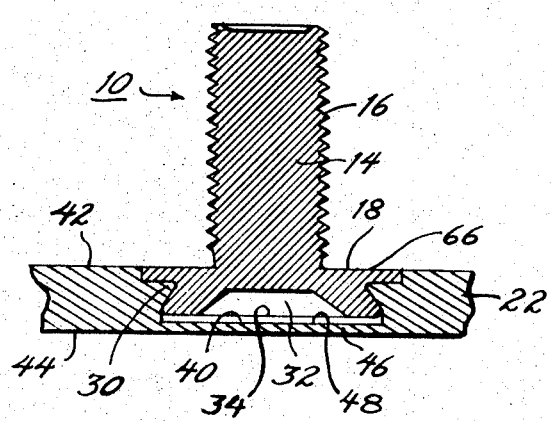

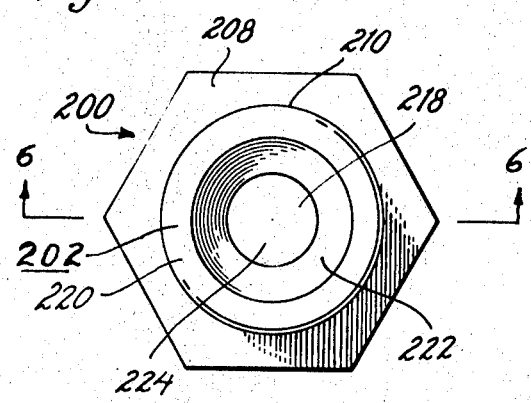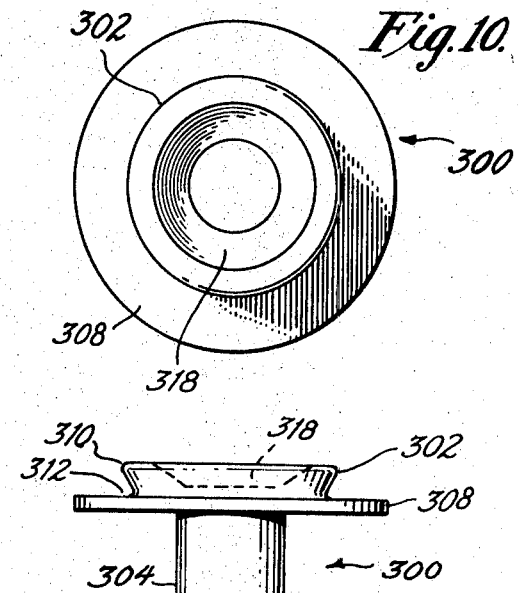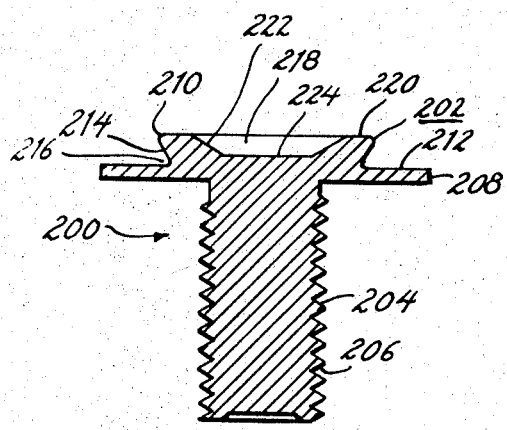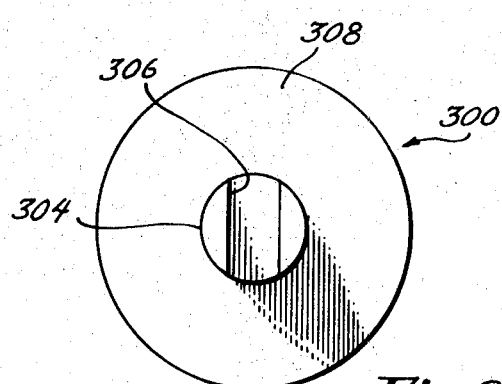

STUD

BACKGROUND OF THE INVENTION

As is known, fasteners or the like, such as studs and soldering terminals, are sometimes secured to thin sheeted materials or panels so that they extend from one surface of the panel, but do not project through the panel. For example, sometimes the front surface of the panel is coated, painted, anodized, or clad with a plastic or a precious metal, and it is required that the coating, etc. be not pierced or otherwise marred. Also, at times the appurtenances on the front surface of the panel, or the use to which the panel is to be put, will not accommodate or permit bolt heads or holes through the panel.

In the foregoing instances a concealed head fastener is often used, the concealed head fastener having a head imbedded in the thin panel by first providing a blind hole in the back surface of the panel and then inserting the head of the fastener into the hole, the head being then squeezed into the panel until it is flush with the back surface of the panel.

Due to the fact that such panels may be as thin as one-sixteenth or three thirty-seconds of an inch, it is seen that after the blind hole is bored in the panel very little panel material remains between the bottom surface of the hole and the front surface of the panel.

Thus, if the head of the fastener has a slight projection on it, or if the bore has not been formed with a completely flat bottom surface, since the clearance between the end face of the head and the bottom surface of the blind hole is very small, it is possible that when the fastener is squeezed into place the projection on the fastener, or on the bottom surface of the blind hole, may be pushed by the head through the front surface of the panel, and thus mar the front surface of the panel.

The fastener described hereinafter tends to substantially reduce the likelihood that the heretofore described marring of the front surface of the panel will take place.

BRIEF SUMMARY OF THE INVENTION

Since the marring of the front surface of the panel has essentially taken place previously because of the possible contact between projections extending from juxtaposed substantially flat surfaces, namely, the end face of the head of the fastener and the bottom surface of the blind hole, it is proposed to make the end face of the head of the fastener recessed and concave so that any projection extending from the bottom surface of the blind hole will extend into the recess without contacting the fastener after the fastener is secured to the panel.

The foregoing and other objects of this invention, the principles of this invention and the best modes in which I have contemplated applying such principles will more fully appear from the following description and accompanying drawings in illustration thereof.

BRIEF DESCRIPTION OF THE VIEWS

In the drawings, FIG. 1 is an enlarged, cross-sectional view of a fastener or stud constructed in accordance with the present invention, the view being taken along the line 1–1 in FIG. 2;

FIG. 2 is a top view of the fastener shown in FIG. 1;

FIG. 3 is a side elevation of the fastener shown in FIGS. 1 and 2, showing the fastener placed upon a panel and prior to the fastener being secured to the panel, the anvil and punch used in securing the fastener to the panel being also illustrated;

FIG. 4 is a cross-sectional view of the fastener and panel showing the fastener and panel secured to each other;

FIG. 5 is a partial, side elevation view of a prior art fastener, showing it about to be secured to a panel, the fastener in FIG. 5 having no recess in the end surface of the pilot facing the bottom surface of the blind hole in the panel;

FIG. 6 is an enlarged, cross-sectional view of another embodiment of a stud constructed in accordance with this invention;

FIG. 7 is a top view of the stud shown in FIG. 6;

FIG. 8 is a side elevation of a further embodiment showing this invention incorporated in a terminal;

FIG. 9 is a bottom view of the terminal shown in FIG. 8; and

FIG. 10 is a top view of the terminal shown in FIGS. 8 and 9.

DETAILED DESCRIPTION

Referring to the drawings, FIG. 1 illustrates a self-clinching fastener or stud 10 having a head 12 and a depending integral shank 14, the shank 14 being provided with threads 16 adapted to receive a nut or the like.

The head 12 is formed by a first annular flange 18, generally circular as shown in FIG. 2, and having its outer peripheral surface knurled, as indicated at 20, in an annular array extending fully around the flange 18 to provide a means tending to resist rotation of the fastener 10 after it is imbedded in a sheeted material or panel 22, FIGS. 3 and 4, i.e., to tend to resist torque forces imposed upon the fastener after it is secured to the panel 22.

The head 12 also includes a second annular flange or pilot 24 which extends radially outwardly less than the knurled flange 18, as shown, and which has an inclined, undercut surface 26 which together with the generally horizontal (as illustrated) surface 28 of the knurled flange 24 define an annular groove 30 into which sheeted material 22, FIG. 4, is forced to flow by the knurled flange 18 when the fastener 10 is secured to the sheeted material.

The pilot 24 is provided with a recess or well 32, substantially centrally located, as shown, communicating with the generally flat end face 34 of the pilot. The well 32 may be defined by a part-conical wall 36 and a generally flat end wall 38, as shown, although it will be seen that the well 32 could be of another shape.

The sheeted material or panel 22 is provided with a blind hole or bore 40 between its two surfaces 42 and 44, as shown in FIGS. 3 and 4. The hole 40 is open at its upper end, as viewed in the drawings, and in communication with the surface 42, but at its opposite end the hole 40 is closed by the relatively thin wall 46 which defines, in part, the surface 44.

As shown, the hole 40 is square shouldered and has a flat, horizontal (as viewed in the drawings) surface 48 which must be slightly spaced from the flat end face 34 of the head 12 after the head is fully secured to the sheeted material or panel 22 to insure that the knurled flange will be fully imbedded.

To secure the fastener 10 to the panel 22, the panel 22 is preferably counterbored to provide a hole a few thousandths of an inch larger in diameter than the outside diameter of the pilot 24 and at least a few thousandths of an inch deeper than the distance between surfaces 66 and 34. The panel 22 is then placed upon a suitable anvil 60 and the fastener 10 is placed upon the panel 22 with the pilot 24 extending into the hole 40 and the knurled flange 18 resting upon the surface 42 of the panel 22. Thereafter a suitable punch 62, having a sufficiently large bore 68, as shown in FIG. 3, is placed over the shank 14 with the face 64 of the punch resting upon the surface 18.

A sufficient force is then applied to the punch 62 to squeeze the knurled flange 18 into the panel 22 adjacent the panel surface 42 at which time the panel material adjacent the flange 18 is displaced by it downwardly and radially inwardly into the annular undercut groove 30 to provide a tight connection between the panel 22 and the head 12.

Since the punch face 64 overhangs the knurled flange 18, the head 12 is driven into the panel only until the surface 66, FIG. 4, of the flange 18 becomes flush with the panel surface 42.

When the knurled flange 18 is driven flush with the upper surface 42 of the panel 22, the end face 34 of the pilot 24 is slightly spaced from the bottom surface 48 of the hole 40, by a few thousandths of an inch, as shown in FIG. 4, in enlarged form, since the hole 40 is made a few thousandths of an inch deeper than the thickness of the head 12 between the surfaces 34 and 66, as indicated previously.

It will be understood that the drawings illustrate the various parts greatly enlarged as the thickness of the panel 22 between front or under surface 44 and the back or upper surface 42 may be as thin as one-sixteenth of an inch.

Also, it will be understood that by providing a central, concave recess or well 32 in the pilot 24, the outer peripheral portion of the pilot 24 between the flange 18 and the end face 34 remains of the same thickness as heretofore, so that it is fully available to form, with the knurled flange 18, a circular groove 30 which is concentric with the well 32.

Further, the well 32 may extend into the head 12 a variable amount, as desired.

While the bore 40 has been described as square shouldered it will be seen that the shoulders thereof could also be radiused depending on the clearances and the shape of the pilot 24. To facilitate entry of the pilot 24 into the bore 40, the pilot 24 is provided with a radiused corner, as shown.

The flange 18 has been described as knurled for the purpose of tending to resist torque forces imposed on the fastener after it is secured to the panel.

The invention has been described primarily in terms of a threaded stud but it is seen that if merely a cylindrical shank is provided, the fastener could be used as a guide pinlike element, but this is not illustrated.

FIG. 5 illustrates a fastener 100 in which the pilot 102 of the head 104 is constructed in accordance with the prior art. The pilot 102 has no recess or well (such as the well 32 shown in FIG. 1 for the fastener 10) and, hence, in FIG. 5 the end face 106 extends across the entire pilot 102. It was found that during the manufacture of such fasteners, a central teat, such as the teat 110 shown in FIG. 5, would sometimes remain on the pilot 102 and would project outwardly from the end face 106. Also, it was found that the hole 112 in the sheeted material or panel 114 might not be provided with a completely flat bottom surface 116 and at times the surface 116 would have an upstanding central teat 118 extending toward the pilot 102.

If the fastener 100 has a teat 110 and/or the panel 114 has a teat 118, since the clearance between the pilot and face 106 and the bottom hole surface 116 is limited to a few thousandths of an inch, the assembly of such fasteners 100 and panels 114 by the anvil 122 and punch 124 (partially shown) resulted in the panel front or under surface 126 being damaged or marred as the teats 110 and 118 tended to belly the surface 126 or to penetrate it.

Thus, it is seen that by providing a clinch-type fastener with a well or concave recess in its pilot, the likelihood of marring or damaging the front or under surface of the panel is substantially reduced or eliminated.

FIGS. 6 and 7 illustrate another embodiment of a self-clinching fastener or stud 200 constructed in accordance with this invention. The stud 200 has a head 202 and a depending integral shank 204, the shank 204 being provided with threads 206 adapted to receive a nut or the like.

The head 202 is formed by a first annular flange 208 of hexagon shape, as shown in FIG. 7, to provide a means tending to resist rotation of the stud 200 after it is imbedded in a sheeted material or panel.

The head 202 also includes a second annular flange or pilot 210 which extends radially outwardly less than the hexagon flange 208, as shown, and which has an inclined, undercut surface 214 which together with the generally horizontal (as illustrated) surface 212 of the hexagon flange 208 define an annular groove 216 into which sheeted material is forced to flow by the hexagon flange 208 when the stud 200 is secured to the sheeted material.

The pilot 210 is provided with a recess or well 218, similar to the well 32 shown in connection with FIGS. 1 to 4, the well 218 being substantially centrally located, as shown, and communicating with the generally flat end face 220 of the pilot. The well 218 may be defined by a part-conical wall 222 and a generally flat end wall 224, as shown, although it will be seen that the well 218 could be of another shape.

FIGS. 8, 9 and 10 illustrate this invention incorporated in a terminal to which electrical wires or the like may be attached or soldered. Referring to FIGS. 8, 9 and 10 a terminal 300 is illustrated having a head 302 and a depending integral shank 304, the shank 304 being provided with an elongated, open ended slot 306.

The head 302 is formed by a first circular flange 308 which is to be imbedded in a sheeted material or panel.

The head 302 also includes a second annular flange or pilot 310 which extends radially outwardly less than the circular flange 308, as shown, and which with the flange 308 defines an undercut groove 312 into which sheeted material is forced to flow by the circular flange 308 when the fastener 10 is secured to the sheeted material.

The pilot 310 is provided with a recess or well 318, substantially centrally located, as shown, and similar to the wells 32 and 218 described in connection with the previous embodiments.

I claim:

1. In combination:
a sheeted material or panel having first and second surfaces and a blind hole between said first and second surfaces;
a fastener or the like including an axially rigid head and a shank;
said head including a first annular flange;
said head including a second annular flange of smaller radial extent than said first annular flange and defining with said first annular flange an undercut annular groove into which sheeted material is displaced by said first annular flange upon assembly to said sheeted material;
said blind hole having an open end portion large enough to receive said second flange and having its opposite end portion closed by a part of said sheeted material to define a substantially planar closed end; and
said head having a central recess juxtaposed with the part of said sheeted material closing said blind hole, the thickness of said sheet material being only slightly greater than the axial extent of said head.

2. The structure set forth in claim 1 wherein said first annular flange includes means tending to resist rotation of said fastener.

3. The structure recited in claim 1 wherein said shank is threaded.

4. The structure recited in claim 1 wherein said shank is slotted.

5. The structure recited in claim 2 wherein said means is a knurl.

6. The structure recited in claim 2 wherein said means comprises forming said first annular flange of noncircular shape.

7. In combination:
a thin sheeted material or panel having first and second surfaces and a blind hole between said first and second surfaces;
a fastener or the like including an axially rigid head and a shank;
said head including an annular flange;
said head including an annular pilot of smaller radial extent than said annular flange and defining with said annular flange an annular undercut groove into which sheeted material is displaced by said annular flange upon assembly to said sheeted material;
said blind hole having an open end portion large enough to receive said pilot and having its opposite end portion closed by a thin part of said sheeted material;
said head having a central recess juxtaposed with part of said sheeted material closing said blind hole;
the thickness of said sheeted material being only slightly greater than the axial extent of said head;
said annular flange including knurls on its outer periphery tending to resist rotation of said fastener; and
said shank being threaded.

8. A one-piece clinch-type fastener adapted to be secured to thin panels comprising:

an axially rigid head and an externally threaded shank being solid in transverse cross section;

said head including a first annular flange;

said head including a second annular flange;

said first annular flange being between said second annular flange and said shank;

said second annular flange being of smaller radial extent than said first annular flange and defining with said first annular flange an undercut annular groove to receive panel material displaced by said head during assembly of said fastener to a panel and said second annular flange having a centrally recessed end face on the side of said head opposite said shank.

9. The structure set forth in claim 8 wherein said first annular flange includes means tending to resist rotation of said fastener.

10. The structure recited in claim 9 wherein said means is a knurl.

11. The structure recited in claim 9 wherein said means is of noncircular shape.

12. A one-piece clinch-type fastener adapted to be secured to thin panels comprising:

an axially rigid head and a shank being solid in transverse cross section;

said head including a first circular flange;

said head including a second circular flange;

said first annular flange being between said second annular flange and said shank;

said second annular flange being of smaller radial extent than said first circular flange and defining with said first circular flange an undercut circular groove;

said second circular flange having a concave end face defining a circular recess centrally disposed on said second circular flange on the side of said head opposite said shank to receive panel material displaced by said head during assembly of said fastener to a panel;

said undercut groove being disposed radially outwardly of said recess and concentric therewith;

said first circular flange including knurls tending to resist rotation of said fastener; and said shank being externally threaded.

13. A one-piece clinch-type terminal adapted to be secured to thin panels comprising:

an axially rigid head and an elongated shank solid in transverse cross section but for a slot at the end opposite said head;

said head including a first annular flange;

said head including a second annular flange;

said first annular flange being between said second annular flange and said shank;

said second annular flange being of smaller radial extent than said first annular flange and defining with said first annular flange an undercut annular groove to receive panel material displaced by said head during assembly of said terminal to a panel; and said second annular flange having a centrally recessed end face on the side of said head opposite said shank.